(12) United States Patent
Inagaki et al.

(10) Patent No.: US 7,604,688 B2
(45) Date of Patent: Oct. 20, 2009

(54) ANTIALLERGEN FILTER, PROCESS FOR PRODUCING THE SAME AND USE THEREOF

(75) Inventors: Jun Inagaki, Aichi (JP); Ryousuke Suga, Aichi (JP); Takahiro Nakajima, Aichi (JP); Mitsuhito Teramoto, Osaka (JP); Taro Suzuki, Osaka (JP)

(73) Assignee: Matsushita Electric Industrial Co., Ltd., Kadoma-Shi (JP)

( * ) Notice: Subject to any disclaimer, the term of this patent is extended or adjusted under 35 U.S.C. 154(b) by 0 days.

(21) Appl. No.: 12/155,602

(22) Filed: Jun. 6, 2008

(65) Prior Publication Data

US 2008/0250934 A1    Oct. 16, 2008

Related U.S. Application Data

(62) Division of application No. 10/550,952, filed as application No. PCT/JP2004/004281 on Mar. 26, 2004, now Pat. No. 7,396,393.

(30) Foreign Application Priority Data

Mar. 28, 2003  (JP) .............................. 2003-090164

(51) Int. Cl.
*B01D 46/00* (2006.01)
(52) U.S. Cl. .............................. 95/285; 96/226; 55/524
(58) Field of Classification Search .................. 95/285; 96/226; 55/524
See application file for complete search history.

(56) References Cited

U.S. PATENT DOCUMENTS

| 4,822,533 A | 4/1989 | Steiner et al. |
| 5,558,158 A | 9/1996 | Elmore |
| 6,234,241 B1 | 5/2001 | Elmore |
| 2006/0278086 A1 | 12/2006 | Inagaki et al. |

FOREIGN PATENT DOCUMENTS

| JP | 9-276630 | 10/1997 |
| JP | 2000-5531 | 1/2000 |
| JP | 2001-269518 | 10/2001 |
| JP | 2002-326944 | 11/2002 |
| JP | 2003-81727 | 3/2003 |
| JP | 2003-82581 | 3/2003 |

OTHER PUBLICATIONS

Japanese Office Action with English translation dated Sep. 16, 2008.

*Primary Examiner*—Robert J Hill, Jr.
*Assistant Examiner*—Karla Hawkins
(74) *Attorney, Agent, or Firm*—Kratz, Quintos & Hanson, LLP

(57) ABSTRACT

An antiallergen filter of the present invention is characterized in that a water-insoluble high-molecular weight anti-allergenic agent having a phenolic hydroxyl group and a moisture-absorbing material are carried on a filter. Because of using the water-insoluble high-molecular weight substance as an anti-allergenic agent, the antiallergen filter of the present invention is free from a problem that the anti-allergenic agent flows and drops or is detached from the filter due to moisture in the atmosphere, etc. even in a highly humid environment or the like. Further, since the moisture-absorbing material is carried on the filter, moisture that the anti-allergenic agent requires for adsorbing and capturing an allergen and inactivating its allergic activity can be effectively retained on the filter. Thus, the antiallergen filter of the present invention can effectively exert its anti-allergenic effect over a prolonged period of time.

1 Claim, 3 Drawing Sheets

ANTIALLERGEN FILTER, PROCESS FOR PRODUCING THE SAME AND USE THEREOF

CROSS REFERENCE TO RELATED APPLICATION

This application is a Divisional Application of prior application Ser. No. 10/550,952, filed on Jun. 29, 2006, now U.S. Pat. No. 7,396,393, which is a 371 national stage application of PCT/JP04/04281, filed on Mar. 26, 2004, which is hereby incorporated by reference.

TECHNICAL FIELD

The present invention relates to a novel antiallergen filter for effectively preventing an allergen from redispersing while maintaining its allergic activity over a prolonged period of time by adsorbing and capturing an allergen such as a mite or pollen and inactivating the allergic activity of the captured allergen, a process for producing the same and the use thereof.

BACKGROUND ART

As a conventionally known antiallergen filter of this type, for example, those obtained by attaching as an anti-allergenic agent, a water-soluble natural component such as a tea polyphenol having an anti-allergenic effect on a filter described in Patent Document 1 (JP-A-2000-5531) or Patent Document 2 (JP-A-2001-269518) are mentioned. The application of such an antiallergen filter to an air cleaning device or a ventilating device as a filter for preventing an allergen from redispersing while maintaining its allergic activity by adsorbing and capturing an allergen such as a mite or pollen and inactivating the allergic activity of the captured allergen has been planned.

However, as for the antiallergen filter obtained by attaching a water-soluble natural component on a filter described in Patent Document 1 or Patent Document 2, since the anti-allergenic agent is soluble in water, though it requires moisture for adsorbing and capturing an allergen and inactivating its allergic activity, there is a problem that the anti-allergenic agent flows and drops or is detached from the filter due to moisture in the atmosphere in a highly humid environment or the like.

As a method for solving such a problem, for example, there is a method of attaching a water-insoluble high-molecular weight anti-allergenic agent such as poly-4-vinylphenol on a filter as described in Patent Document 3 (JP-A-2003-81727). However, by only attaching such a water-insoluble high-molecular weight anti-allergenic agent solely on a filter, a satisfying effect cannot always be obtained.

Accordingly an object of the present invention is to provide a novel antiallergen filter for effectively preventing an allergen from redispersing while maintaining its allergic activity over a prolonged period of time by adsorbing and capturing an allergen such as a mite or pollen and inactivating the allergic activity of the captured allergen, a process for producing the same and the use thereof.

DISCLOSURE OF THE INVENTION

An antiallergen filter of the present invention, which was made in view of the above-mentioned points, is characterized in that a water-insoluble high-molecular weight anti-allergenic agent having a phenolic hydroxyl group and a moisture-absorbing material are carried on a filter as described in Claim 1.

In addition, an antiallergen filter described in Claim 2 is characterized in that, in the antiallergen filter described in Claim 1, the water-insoluble high-molecular weight anti-allergenic agent is poly-4-vinylphenol.

In addition, an antiallergen filter described in Claim 3 is characterized in that, in the antiallergen filter described in Claim 1, the moisture-absorbing material is a moisture-absorbing polymer.

In addition, an antiallergen filter described in Claim 4 is characterized in that, in the antiallergen filter described in Claim 1, the water-insoluble high-molecular weight anti-allergenic agent having a phenolic hydroxyl group and the moisture-absorbing material are attached on one surface of the filter.

In addition, a process for producing an antiallergen filter of the present invention is characterized by coating a filter with a treating liquid prepared by dissolving and/or dispersing a water-insoluble high-molecular weight anti-allergenic agent having a phenolic hydroxyl group and a moisture-absorbing material in a water-containing organic solvent followed by drying as described in Claim 5.

In addition, a device of the present invention is characterized in that the antiallergen filter described in Claim 1 is disposed between an air inlet and outlet as described in Claim 6.

In addition, a device described in Claim 7 is characterized in that, in the device described in Claim 6, the antiallergen filter described in Claim 4 is disposed in such a manner that the surface on which the water-insoluble high-molecular weight anti-allergenic agent having a phenolic hydroxyl group and the moisture-absorbing material are attached faces the outlet side of the device.

In addition, a device described in Claim 8 is characterized in that, in the device described in Claim 6, it is an air cleaning device or a ventilating device.

According to the present invention, a novel antiallergen filter for effectively preventing an allergen from redispersing while maintaining its allergic activity over a prolonged period of time by adsorbing and capturing an allergen such as a mite or pollen and inactivating the allergic activity of the captured allergen, a process for producing the same and the use thereof are provided.

BEST MODE FOR CARRYING OUT THE INVENTION

Figure 1:
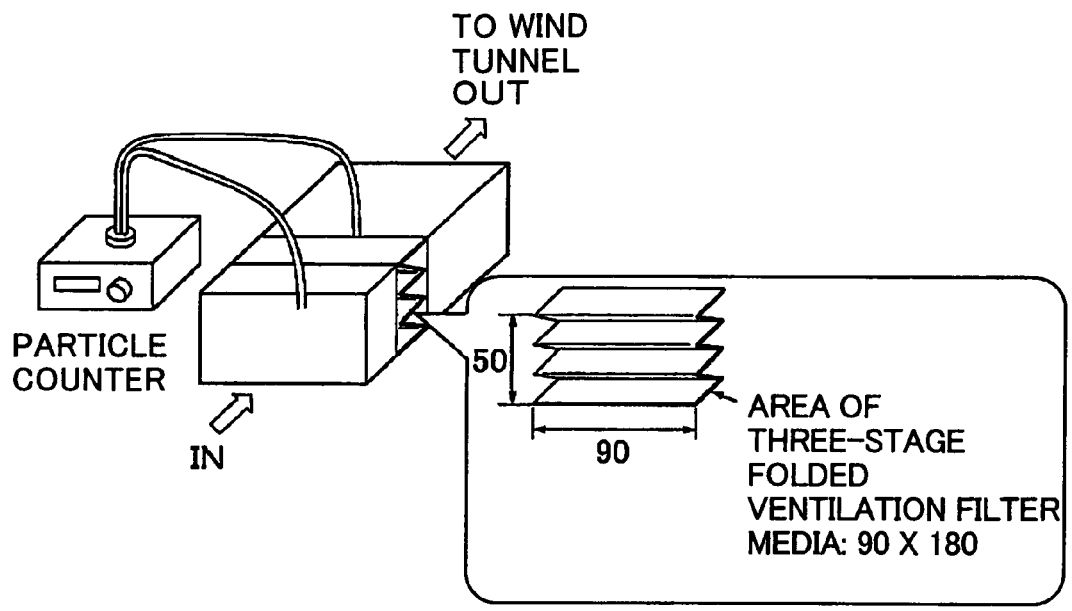
FIG. 1 is a schematic view showing a method of investigating the pressure loss and the dust collection efficiency in Example 1.

An antiallergen filter of the present invention is characterized in that a water-insoluble high-molecular weight anti-allergenic agent having a phenolic hydroxyl group and a moisture-absorbing material are carried on a filter. Because of using the water-insoluble high-molecular weight substance as an anti-allergenic agent, the antiallergen filter of the present invention is free from a problem that the anti-allergenic agent flows and drops or is detached from the filter due to moisture in the atmosphere, etc. even in a highly humid environment or the like. Further, since the moisture-absorbing material is carried on the filter, moisture that the anti-allergenic agent requires for adsorbing and capturing an allergen and inactivating its allergic activity can be effectively retained on the filter. Thus, the antiallergen filter of the present invention can effectively exert its anti-allergenic effect over a prolonged period of time.

In the antiallergen filter of the present invention, as the water-insoluble high-molecular weight anti-allergenic agent having a phenolic hydroxyl group carried on the filter, preferably poly-4-vinylphenol is used. For example, poly-4-vinylphenol with a molecular weight of 8,000 or 20,000 is available from Aldrich Co. It seems that a number of phenolic hydroxyl groups that poly-4-vinylphenol has contribute to adsorption and capture of an allergen and inactivation of its allergic activity.

In the antiallergen filter of the present invention, examples of the moisture-absorbing material carried on the filter include moisture-absorbing polymers such as polyether-ester polymers, polyether-ester-amide polymers, polyvinylpyrrolidone polymers and crosslinked materials of polyethylene oxides, and other than these, crosslinked materials of silane coupling agents, a variety of inorganic hydrophilic materials and the like.

Examples of a filter material (dust collecting filter material) in the antiallergen filter of the present invention include synthetic fibers such as polypropylene fibers and polyester fibers, glass fibers, natural fibers of such as cotton and the like. These are used after being processed in the form of a non-woven cloth or a woven cloth in accordance with the intended use.

The antiallergen filter of the present invention can be produced by, for example, coating the filter with a treating liquid prepared by dissolving and/or dispersing the water-insoluble high-molecular weight anti-allergenic agent having a phenolic hydroxyl group and the moisture-absorbing material in a water-containing organic solvent followed by drying.

The reason why the water-insoluble high-molecular weight anti-allergenic agent having a phenolic hydroxyl group and the moisture-absorbing material are dissolved and/or dispersed in a water-containing organic solvent is that it is necessary to prepare a homogeneous treating liquid having an appropriate viscosity in order to homogeneously attach the water-insoluble high-molecular weight anti-allergenic agent having a phenolic hydroxyl group and the moisture-absorbing material on a filter. The organic solvent is not particularly limited as long as it is miscible with water, and lower alcohols such as ethyl alcohol and isopropyl alcohol, polyhydric alcohols such as ethylene glycol and glycerol, acetone and the like can be used alone or in combination of plural types. It is preferred that the mixing ratio (volume ratio) of the organic solvent to water is 3:7 or higher. Incidentally, in order to improve solubility or dispersibility of the water-containing organic solvent to the water-insoluble high-molecular weight anti-allergenic agent having a phenolic hydroxyl group and the moisture-absorbing material, concentrated ammonia water or a surfactant may be added to the water-containing organic solvent.

The coating of the filter with the treating liquid may be carried out by dipping the filter in the treating liquid or by spraying the treating liquid on the filter. The subsequent drying may be carried out naturally or by heating.

It is preferred that the total attached amount of the water-insoluble high-molecular weight anti-allergenic agent having a phenolic hydroxyl group and the moisture-absorbing material is from $1 \text{ g/m}^2$ to $20 \text{ g/m}^2$. It is because when the attached amount is too small, an anti-allergenic effect is not sufficiently exerted, on the other hand, when it is too much, the pressure loss of the filter becomes large.

Incidentally, the antiallergen filter of the present invention may be produced by sticking a dust collecting filter media processed in a predetermined form to a filter frame material on which the water-insoluble high-molecular weight anti-allergenic agent having a phenolic hydroxyl group and the moisture-absorbing material are attached. In addition, it may be produced by processing a filter material into which the water-insoluble high-molecular weight anti-allergenic agent having a phenolic hydroxyl group and the moisture-absorbing material are kneaded in a predetermined form.

The antiallergen filter produced as described above is used in such a manner that it is disposed between an air inlet and outlet of an air cleaning device, a ventilating device or the like.

EXAMPLES

Hereinafter, the present invention will be described in detail with reference to Examples, however, the present invention is not construed as being limited to the following description.

Example 1

Production of Antiallergen Filter and its Characteristics

A treating liquid prepared by dissolving poly-4-vinylphenol (molecular weight: 8,000, manufactured by Aldrich Co.) and a moisture-absorbing polymer in a water-containing isopropyl alcohol (the mixing ratio of isopropyl alcohol to water on a volume basis was 7:3) was sprayed 9 times on one surface of an electret filter prepared by applying a high voltage to a polypropylene fiber under the condition of heating thereby making it into a heat-treated electret and processing it in a predetermined form, followed by naturally drying, whereby an antiallergen filter was produced. The total attached amount of poly-4-vinylphenol and the moisture-absorbing polymer in this antiallergen filter was $6.06 \text{ g/m}^2$.

By using this antiallergen filter, the water content at a temperature of 25° C. and a humidity of 95% was investigated based on the weight change when it was heated from 25° C. to 120° C., and as a result, it was greater by about $1 \text{ g/m}^2$ compared with an untreated filter. In addition, the water content under the conditions other than those above was also greater by $0.05 \text{ g/m}^2$ to $1 \text{ g/m}^2$ compared with an untreated filter. Accordingly, it was found that this antiallergen filter is excellent in a water-absorbing ability.

Air was passed through this antiallergen filter at different rates, and the pressure loss and the dust collection efficiency were investigated as shown in FIG. 1. At this time, the antiallergen filter was placed in such a manner that the surface on which poly-4-vinylphenol and the moisture-absorbing polymer were attached was disposed on the downstream side of the air flow, and the test was carried out. The results are shown in Table 1. As is clear from Table 1, by attaching poly-4-vinylphenol and the moisture-absorbing polymer on the filter, the pressure loss and the dust collection efficiency increased, though slightly, compared with an untreated filter.

TABLE 1

|  |  | Untreated filter | Antiallergen filter |
| --- | --- | --- | --- |
| Attached amount | g/m² | 0 | 6.06 |
| Pressure loss (0.3 m/s) | Pa | 64.6 | 66.7 |
| Pressure loss (0.5 m/s) | Pa | 116.6 | 120.7 |
| Pressure loss (0.8 m/s) | Pa | 262.1 | 264.9 |
| ΔP (0.3 m/s) | Pa | — | 2.1 |
| ΔP (0.5 m/s) | Pa | — | 4.1 |
| ΔP (0.8 m/s) | Pa | — | 2.8 |
| Dust collection efficiency (0.3 m/s) | % | 99.8 | 99.9 |
| Dust collection efficiency (0.5 m/s) | % | 97.7 | 98.7 |
| Dust collection efficiency (0.8 m/s) | % | 97.3 | 97.4 |

Example 2

Figure 2:
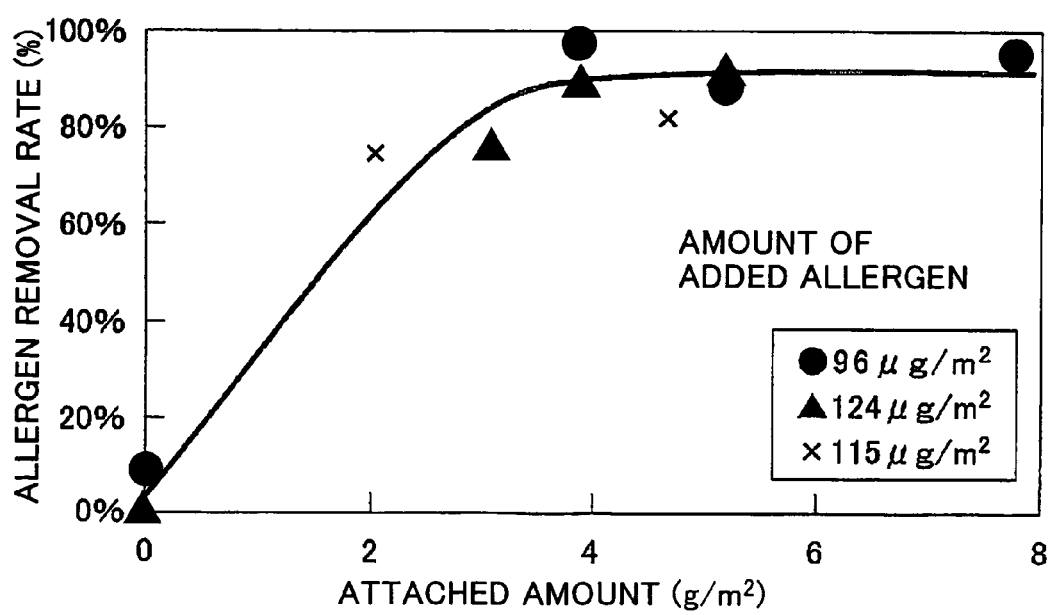
FIG. 2 is a graph showing the correlation between the total attached amount of poly-4-vinylphenol and a moisture-absorbing polymer and the allergen removal rate in Example 2.

Correlation Between the Total Attached Amount of poly-4-vinylphenol and Moisture-absorbing Polymer and Allergen Removal Rate The degree of decrease in allergen when an antiallergen filter which was produced in the same manner as in Example 1 and on which poly-4-vinylphenol and a moisture-absorbing polymer were attached at different total amounts were contacted overnight with a liquid containing different amounts of Der f1 (derived from *D. farinae*) as an allergen was analyzed by the ELISA method, and the correlation between the total attached amount of poly-4-vinylphenol and a moisture-absorbing polymer and the allergen removal rate was investigated. The results are shown in FIG. 2. As is clear from FIG. 2, the allergen removal rate increased accompanying the increase in the total attached amount, and reached a substantial plateau at an attached amount of 4 g/m².

Example 3

Figure 3:
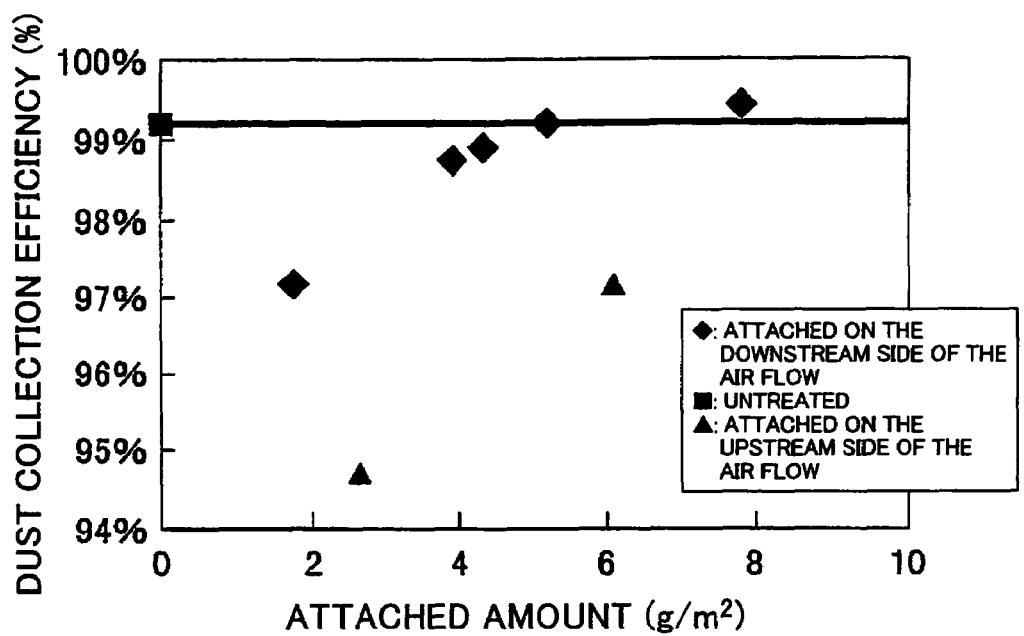
FIG. 3 is a graph showing the correlation between the total attached amount of poly-4-vinylphenol and a moisture-absorbing polymer and the dust collection efficiency in Example 3.

Correlation Between the Total Attached Amount of poly-4-vinylphenol and Moisture-absorbing Polymer and Dust Collection Efficiency The dust collection efficiency at a ventilation rate of 0.5 m/s was investigated in the same manner as in Example 1 for an antiallergen filter produced in the same manner as in Example 1 and on which poly-4-vinylphenol and a moisture-absorbing polymer were attached at different total amounts. The results are shown in FIG. 3. As is clear from FIG. 3, the dust collection efficiency increased accompanying the increase in the total attached amount. At this time, the dust collection efficiency in the case where the surface on which poly-4-vinylphenol and a moisture-absorbing polymer were attached was disposed on the downstream side of the air flow is superior to that in the case where the surface was disposed on the upstream side of the air flow.

Example 4

Air Cleaning Device

Figure 4:
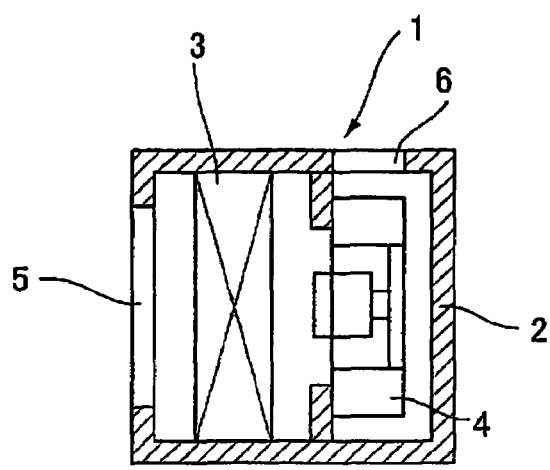
FIG. 4 is a schematic cross-sectional view showing an air cleaning device in Example 4.

As shown in FIG. 4, an air cleaning device 1 is provided with an antiallergen filter 3 produced in Example 1, a fan 4, an inlet 5 and an outlet 6 in the inside of a frame body 2.

Polluted air containing an allergen or the like is sucked from the inlet 5 of the air cleaning device 1 by the fan 4 and sent to the antiallergen filter 3, whereby a contaminant is filtered by the filter. At this time, the antiallergen filter 3 adsorbs and captures an allergen and inactivates the allergic activity of the captured allergen. The cleaned air is discharged from the outlet 6. It is preferred that the antiallergen filter 3 is placed so that the surface on which poly-4-vinylphenol and the moisture-absorbing polymer were attached is disposed on the downstream side of the air flow in order to suppress the increase in pressure loss and obtain a superior dust collection efficiency.

Example 5

Ventilating Device

Figure 5:
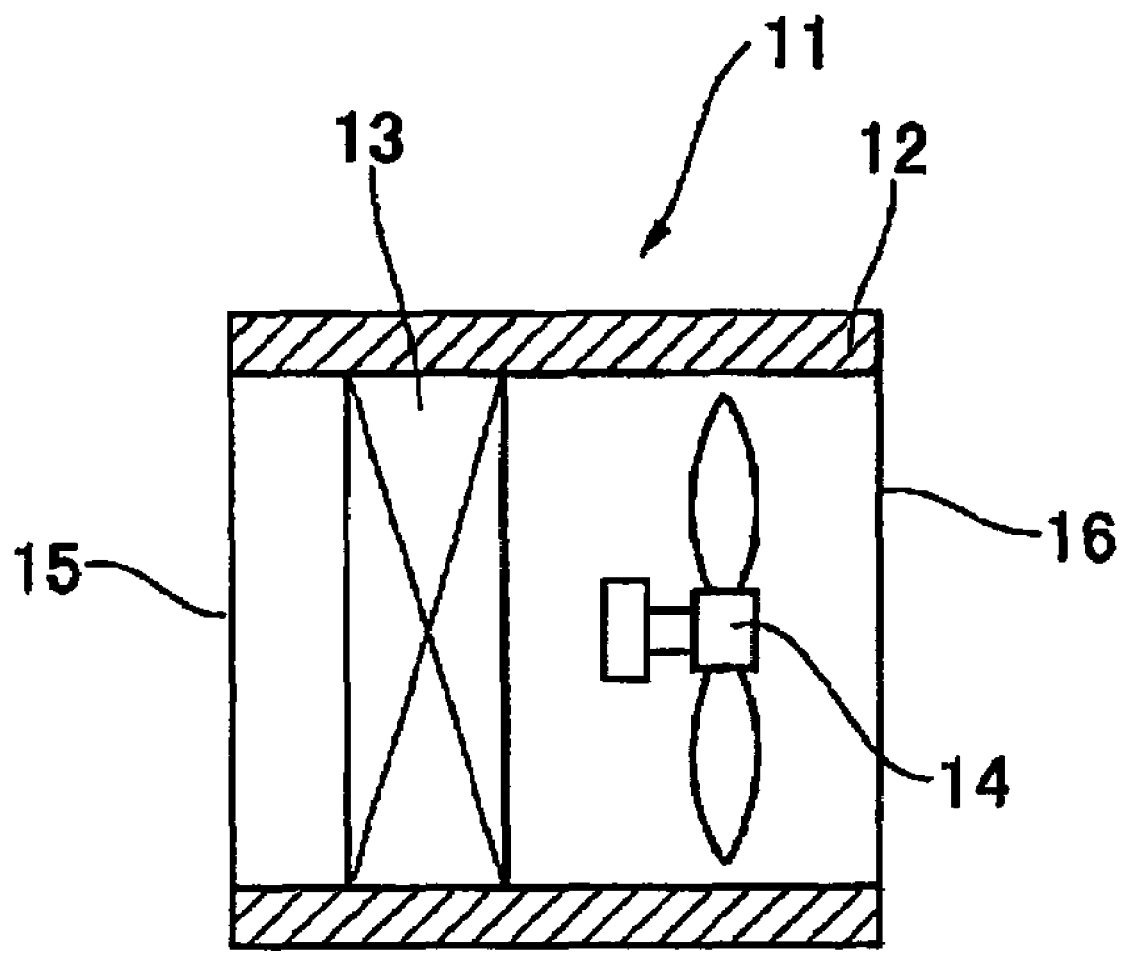
FIG. 5 is a schematic cross-sectional view showing a ventilating device in Example 5.

As shown in FIG. 5, a ventilating device 11 is provided with an antiallergen filter 13 produced in Example 1, an air blower unit 14, an inlet 15 and an outlet 16 in the inside of a duct 12.

Polluted air containing an allergen or the like is sucked from the inlet 15 of the ventilating device 11 by the air blower unit 14 and sent to the antiallergen filter 13, whereby a contaminant is filtered by the filter. At this time, the antiallergen filter 13 adsorbs and captures an allergen and inactivates the allergic activity of the captured allergen. The cleaned air is discharged from the outlet 16. It is preferred that the antiallergen filter 13 is placed so that the surface on which poly-4-vinylphenol and the moisture-absorbing polymer were attached is disposed on the downstream side of the air flow in order to suppress the increase in pressure loss and obtain a superior dust collection efficiency.

INDUSTRIAL APPLICABILITY

The present invention has an industrial applicability in terms of being able to provide a novel antiallergen filter for effectively preventing an allergen from redispersing while maintaining its allergic activity over a prolonged period of time by adsorbing and capturing an allergen such as a mite or pollen and inactivating the allergic activity of the captured allergen, a process for producing the same and the use thereof.

The invention claimed is:

1. A process for producing an antiallergen filter, comprising coating a filter with a treating liquid prepared by dissolving and/or dispersing a water-insoluble high-molecular weight anti-allergenic agent having a phenolic hydroxyl group and a moisture-absorbing material in a water-containing organic solvent followed by drying.

* * * * *